(12) United States Patent
Yoshida et al.

(10) Patent No.: US 6,180,285 B1
(45) Date of Patent: Jan. 30, 2001

(54) EXPOSED CONDUCTIVE CORE BATTERY

(75) Inventors: Masahiko Yoshida, Osaka; Fumio Daio, Nara, both of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/127,704

(22) Filed: Jul. 31, 1998

(30) Foreign Application Priority Data

Jul. 31, 1997 (JP) ................................... 9-205665

(51) Int. Cl.[7] .......................... H01M 4/74; H01M 4/72
(52) U.S. Cl. ..................... 429/241; 429/233; 429/242; 429/60
(58) Field of Search .................... 429/211, 233, 429/241, 242, 60

(56) References Cited

U.S. PATENT DOCUMENTS 5,458,993 * 10/1995 Terao et al. ......................... 429/94
5,965,290 * 10/1999 Shimizu et al. ..................... 429/94

* cited by examiner

Primary Examiner—Maria Nuzzolillo
Assistant Examiner—Angela J. Martin
(74) Attorney, Agent, or Firm—Ratner & Prestia

(57) ABSTRACT

A battery has an organic electrolyte, a negative electrode having at least one metal out of alkaline metal and alkaline metal alloy, and a positive electrode including a conductive core having at least one metal out of porous metal plate and metal mesh, wherein an active material covers the core. At least a part of one side of the core is exposed from the active material at a position confronting the negative electrode, and the width of narrowest part of the metal is greater than the thickness of the negative electrode. In this constitution, the discharge reaction is delayed in the exposed portion of the core of the positive electrode. By this delay in discharge reaction, the electric connection of the negative electrode is maintained up to the end of discharge. Hence, voltage drop at the end of discharge is suppressed. As a result, the battery having an excellent discharge capacity up to the end of the discharge is obtained.

13 Claims, 6 Drawing Sheets

EXPOSED CONDUCTIVE CORE BATTERY

FIELD OF THE INVENTION

The present invention relates to a battery having a wound electrode, and more particularly to an organic electrolyte cell.

BACKGROUND OF THE INVENTION

Hitherto, as organic electrolyte cells having wound electrodes, for example, lithium graphite-fluoride cells and lithium manganesedioxide cells have been known. The organic electrolyte cells have excellent discharge characteristics and storage properties, and are hence widely used in applications momentarily requiring a large current such as a camera and a strobe, applications of long-term use such as memory back-up, and others. Recently, as these appliances are enhanced in performance, the organic electrolyte cells are also required to be further enhanced in discharge capacity.

In these cells, foils of an alkaline metal such as lithium or its alloy are used as negative electrodes. A conductive metal is used as the active material for the negative electrode. Accordingly, except for a lead-like current collector to be welded to the can, a conductive core not relating to the discharge reaction is not needed. Instead, the filling amount of the active material can be increased by a corresponding portion. However, if a difference in speed occurs in the discharge reaction due to non-uniformity of the partial active material amount or an imbalance of pressure applied to electrode plates, part of the negative electrode may be extremely consumed, and the electric connection between the current collector and the active material of negative electrode may be lost. As a result, at the end of discharge, due to a decrease in the reaction area of the negative electrode, a sudden drop of discharge voltage occurs. In particular, this discharge voltage drop is notable in the case of low current discharge.

The invention hence solves the problem of localized consumption of the organic electrolyte cell as described in the prior art, suppresses the voltage drop at the end of cell discharge, and presents an organic electrolyte cell of high performance having an excellent discharge capacity.

SUMMARY OF THE INVENTION

The cell of the present invention comprises an electrolyte, a negative electrode, and a positive electrode including a conductive core and an active material disposed so as to cover the core, in which at least part of the core is exposed from the active material at a position confronting the negative electrode.

Preferably, the core is at least one metal selected from a porous metal plate and a metal mesh, and the width of the narrowest part of the metal is larger than the thickness of the negative electrode.

Preferably, one side of the core is exposed.

In this constitution, the discharge reaction is delayed in the exposed portion of the core of the positive electrode. By this delay of the discharge reaction, electric connection of the negative electrode is maintained up to the end of discharge. Accordingly, voltage drop at the end of discharge is suppressed. As a result, a battery having an excellent discharge capacity up to the end of discharge is obtained.

REFERENCE NUMERALS

Figure 1:
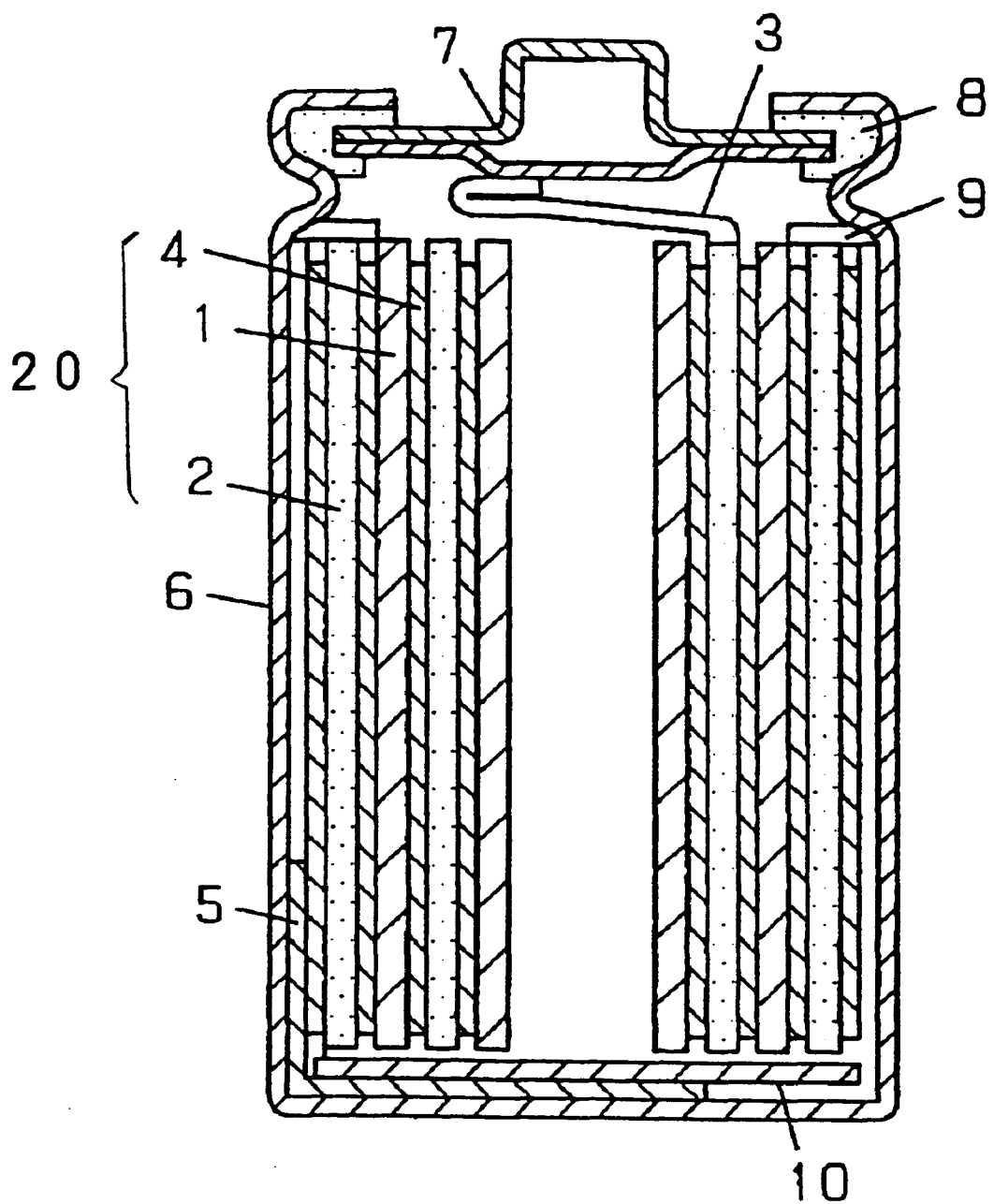
FIG. 1 is a sectional view of a battery in an embodiment of the invention.

1 Negative electrode
1a Polypropylene adhesive tape
2 Positive electrode
2a Positive electrode conductive core
2b Cutting width
2c Width of narrowest part
2e Active material
2x Protruding portion
3 Positive electrode current collector
3a Electric insulating tape
4 Separator
5 Negative electrode current collector
6 Can
7 Sealing plate
8 Gasket
9 Upper insulating sealing plate
10 Lower insulating sealing plate
20 Plate group

DETAILED DESCRIPTION OF THE INVENTION

Figure 2:
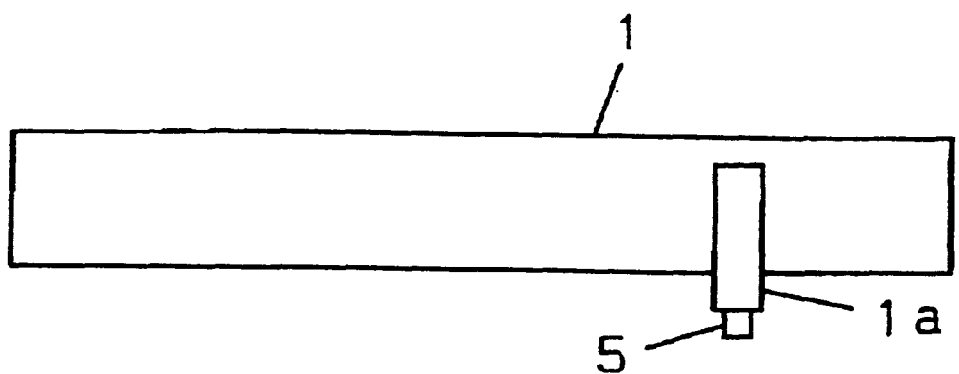
FIG. 2 is a front view of a negative electrode used in the battery in the embodiment of the invention.
Figure 3:
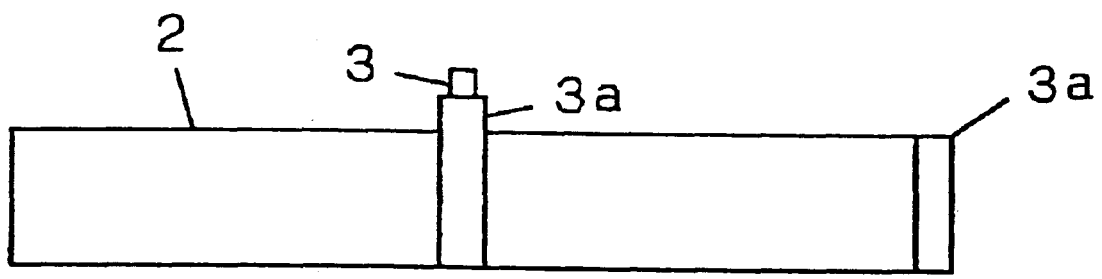
FIG. 3 is a front view of a positive electrode used in the battery in the embodiment of the invention.
Figure 4:
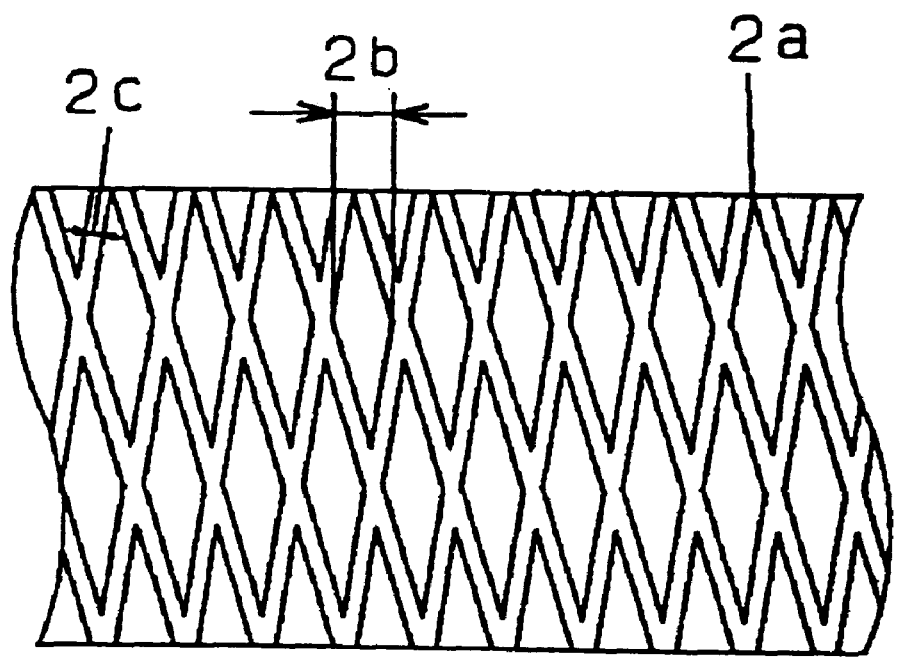
FIG. 4(a) is a partially magnified plan view of a core used in the positive electrode of the battery in the embodiment of the invention.
FIG. 4(b) is a sectional view of the positive electrode of the battery in the embodiment of the invention.
Figure 4:
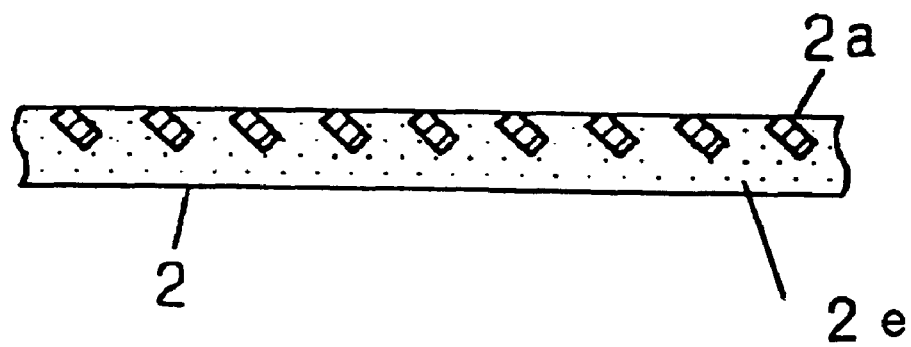

A sectional view of a battery in an embodiment of the invention is shown in FIG. 1. A front view of a negative plate used in the battery in the embodiment of the invention is shown in FIG. 2. A front view of a positive plate used in the battery in the embodiment of the invention is shown in FIG. 3. A partially magnified plan view of a core used in the positive electrode of the battery in the embodiment of the invention is shown in FIG. 4(a), and a sectional view of the positive electrode is shown in FIG. 4(b).

In FIG. 1, a positive electrode 2 and a negative electrode 1 are spirally wound in a can 6 through a separator 4. A positive electrode current collector 3 is connected to the positive electrode 2, and a negative electrode current collector 5 is connected to the negative electrode 1. The other end of the positive electrode current collector 3 is connected to a sealing plate 7, and the other end of the negative electrode current collector 5 is connected to the inner side of a can 6. The positive electrode 2 has a conductive core 2a made of porous metal plate or metal mesh, and a positive electrode active material 2e is applied or buried in the core 2a.

The sealing plate 7 is placed to cover the opening of the can 6 through a gasket 8. To prevent contact between the upper side of a plate group 20 and can 6 and sealing plate 7, an upper electric insulating sealing plate 9 is placed at the upper side of the plate group. To prevent contact between the lower side of the plate group 20 and the can 6, a lower electric insulating sealing plate 9 is placed at the lower side of the plate group.

In the battery, which is composed by spirally winding the positive electrode 2 and negative electrode 1, an electric insulating tape 3a is adhered to prevent an internal short-circuit due to burrs mainly in the conductive core 2a and current collector 3. However, the negative electrode active material opposite to the end face of the electric insulating tape 3a also reacts with the positive electrode active material 2e in the portion concealed by the electric insulating tape 3a. Thus, a non-uniformity occurs in the electric capacity of the positive electrode 2 and negative electrode 1. Furthermore, the adhering portion of the electric insulating tape 3a and current collector 3 is relatively thicker than other parts. There, the pressure for pressing the negative electrodes 1 and positive electrode 2 is relatively higher, and hence the reaction speed in the adhering portion is accelerated. In most organic electrolyte cells, since a metal foil of lithium or lithium alloy is used as the negative electrode 1, the negative electrode 1, which has a fast discharge reaction, is consumed at the end of discharge, and electric connection of the negative electrode cannot be maintained. Thus, a sudden decline of reaction area occurs and discharge voltage drops suddenly at the same time. Discharge is actually terminated at the falling moment of voltage, and the active material 2e in the portion failing in electric connection does not contribute to the discharge reaction, and hence the discharge capacity is lowered.

In the present invention, by taking note of the conductive core 2a of the positive electrode 2, the electric connection of the negative electrode 1 is maintained, and sudden voltage and discharge capacity drops at the end of discharge are prevented. That is, the conductive core 2a of the positive electrode 2, which is a porous metal plate such as expand metal, punching metal, or metal mesh, and part or all of the conductive core 2a is exposed only to one side of the surface of the positive electrode 2. In this constitution, a discharge reaction of the exposed part is suppressed. In particular, by defining the narrowest portion in the shape of projecting this porous metal plate or metal mesh to the surface of the confronting negative electrode 1 to be equal to the width of the narrowest part 2c in the metal portion of the positive electrode conductive core 2a, the suppressing effect of the discharge reaction is most apparent when the width of narrowest part 2c is greater than the thickness of the negative electrode 1. Accordingly, the negative electrode 1 confronting the exposed portion of the positive electrode 2 remains until the end of discharge, as compared with other parts, so that a sudden drop of discharge voltage or a decline of discharge capacity can be suppressed.

EXEMPLARY EMBODIMENTS

Embodiments of the invention are described herein by referring to specific results of experiments.

Cell (A)

A cylindrical cell of 17 mm in diameter and 34 mm in height as shown in FIG. 1 was fabricated.

First, a negative electrode 1 was fabricated in the following procedure. A lithium plate of 0.16 mm in thickness was cut in a size of 230 mm×23 mm, and a nickel lead of 0.1 mm in thickness was pressed thereto, and a negative electrode current collector 5 was fabricated. A polypropylene adhesive tape 1a of 0.05 mm in thickness was adhered on the negative electrode current collector 5. The shape of this negative electrode 1 is shown in FIG. 2.

Next, a positive electrode 2 was fabricated in the following procedure. As a positive electrode active material 2e, electrolytic manganese dioxide, carbon, polytetrafluoroethylene, and ion exchange water were kneaded. The mixing ratio of manganese dioxide, carbon and polytetrafluoroethylene is 100:6:4. Then, a positive electrode conductive core 2a of stainless steel expand metal of 0.1 mm in thickness, 1 mm in cutting width 2b, and 0.2 mm in width at the narrowest part 2c was fabricated. A plan view of the core 2a is shown in FIG. 4(a). On one side of the core 2a, a positive electrode active material 2e was applied once in a thickness of 0.6 mm, and it was rolled in a thickness of 0.45 mm. The shape of this positive electrode 2 is shown in FIG. 3, and its surface state is given in FIG. 4(a) and FIG. 4(b). In this state, the active material 2e is placed at one side of the core 2a, and other side of the positive electrode conductive core 2a is exposed from the active material 2e. It was cut in a size of 230 mm×26 mm to obtain positive electrode 1. A positive electrode current collector 3 was resistance welded to the positive electrode 1. Further, on the positive electrode current collector 3, as an electric insulating tape 3a, a glass cloth tape was adhered as electric insulating material, and dried for 4 hours at 250 deg. C. This is, the skeleton width of the expand metal core is the width of narrowest part 2c.

Thus, the fabricated positive electrode 2 and the negative electrode 1 were spirally wound through a separator 4 of polypropylene fine porous film, and a plate group 20 was fabricated. At this time, the negative electrode current collector 5 is positioned on the outermost circumference of the plate group 20. One side of the core 2a is exposed from the active material 2e at the position confronting the negative electrode 1.

This plate group 20 was put in a can 6, and the negative electrode current collector 5 is welded to the can 6, and the positive electrode current collector 3 was welded to the sealing plate 7. Then, the can 6 was filled with electrolyte. The electrolyte consists of solvent and solute, and the solvent was a 1:1 mixed solution of propylene carbonate and dimethoxy ethane, and the solute was a 0.5 mol/liter solution of lithium trifluoromethane sulfonate. A cell (A) was set up further through a gasket 8, an upper insulating sealing plate 9, and a lower insulating sealing plate 10, and sealing them by crimping. That is, the width of narrowest part 2c of the core 2a of the positive electrode 2 is 0.2 mm, the thickness of the negative electrode 1 is 0.16 mm, and hence the width of narrowest part 2c of the core 2a is greater than the thickness of the negative electrode 1. One side of the core 2a of the positive electrode 2 is exposed.

Cell (B)

Cell (B), a cylindrical cell of the same dimensions as in cell (A) was fabricated. An expanded metal of 0.1 mm in thickness, 0.5 mm in cutting width 2b, and 0.18 mm in width of narrowest part 2c was used as a positive electrode conductive core 2a of the positive electrode 2. The shape of this core 2a is shown in FIG. 4(a). Using this core 2a and the negative electrode 1 used in the cell (A), the cell (B) was manufactured in the same method as in the cell (A). That is, the active material is not placed at the other side, and the core 2a is exposed. The width of the narrowest part 2c of the core 2a of the positive electrode 2 is 0.18 mm, and the thickness of the negative electrode 1 is 0.16 mm. Hence, the width of narrowest part 2c of the core 2a is greater than the thickness of the negative electrode 1. Further, one side of the core 2a of the positive electrode 2 is exposed.

Cell (C)

A cylindrical cell of the same dimensions as in cell (A) was fabricated. A stainless steel mesh of 0.18 mm in wire diameter and 1 mm in cutting width 2a was used as a positive electrode conductive core 2a of the positive electrode 2. Using this core 2a and the negative electrode 1 used in the cell (A), a cell (C) was manufactured in the same method as in the cell (A). In the cell (C), the width of the narrowest part 2c of the core 2a is 0.18 mm corresponding to the wire diameter, and the thickness of the negative electrode 1 is 0.16 mm. Hence, the width of narrowest part 2c of the core 2a is greater than the thickness of the negative electrode 1. Further, one side of the core 2a of the positive electrode 2 is exposed.

Cell (D)

Figure 7:
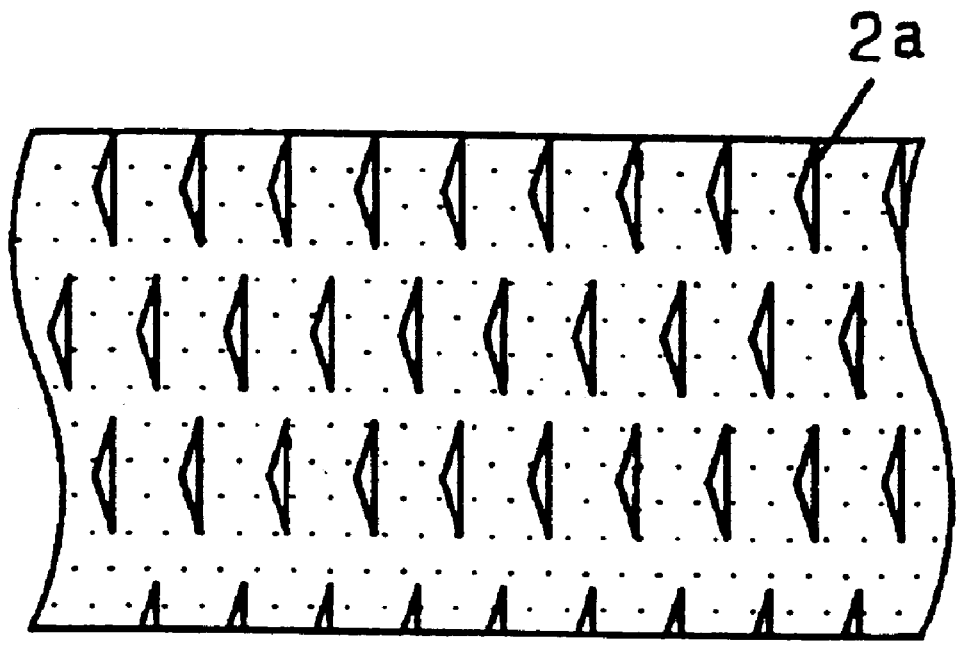
FIG. 7(a) is a partial plan view of a positive plate in an exposed state of protruding portion of a positive electrode conductive core to the positive electrode surface in the battery used in an embodiment of the invention.
FIG. 7(b) is a sectional view of the positive electrode shown in FIG. 7(a).
Figure 7:
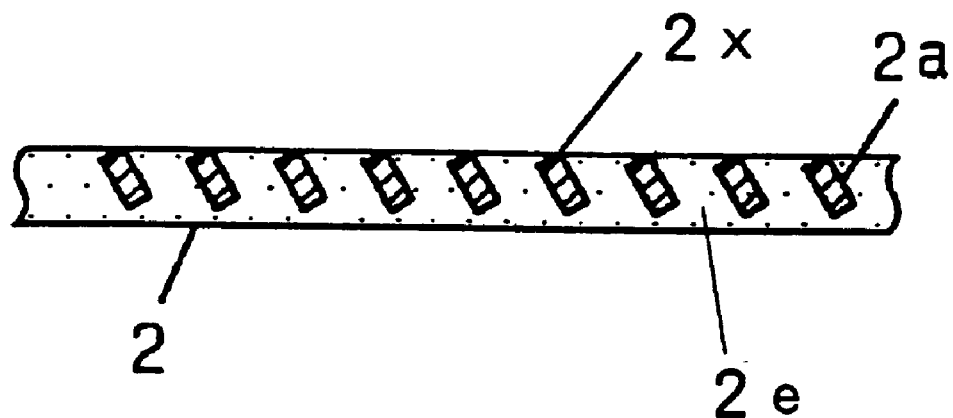

A cylindrical cell of the same dimensions as in cell (A) was fabricated. A porous metal plate of three-dimensional structure having protrusions 2x as shown in FIG. 7(a) and FIG. 7(b) was used as a positive electrode conductive core 2a of a positive electrode 2. The same active material 2e as in the cell (A) was placed at both sides of this porous metal plate. In this case, the protrusions 2x at one side only of the core 2a are exposed from the surface of the active material. This exposed portion is discontinuous. Using this positive electrode 2 and the negative electrode 1 used in the cell (A), a cell (D) was manufactured. The width of narrowest part of the core is 0.2 mm, and the thickness of the negative electrode 1 is 0.16 mm. Hence, in the cell (D), the width of narrowest part 2c of the core 2a is greater than the thickness of the negative electrode 1. Further, part of one side of the core 2a of the positive electrode 2 is exposed.

Cell (E)

A cylindrical cell of the same dimensions as in cell (A) was fabricated. Using a core 2a having the same shape as in the cell (A), a positive electrode 2 was fabricated. In this case, an active material 2e is placed in the core 2a, except for the portion to which an insulating tape 3a is adhered. Using this core 2a, the negative electrode 1 used in the cell (A), and the electric insulating tape 3a, a cell (E) was manufactured. The other constituents are the same as in cell (A). That is, in cell (E), the width of the narrowest part 2c of the core 2a is greater than the thickness of the negative electrode 1. Further, the electric insulating tape 3a adhered to a portion of the core 2a is exposed.

Cell (F)

As a cell (F), a cylindrical cell of the same dimensions as in cell (A) was fabricated. An expanded metal of 0.1 mm in thickness, 1.0 mm in cutting width 2b, and 0.15 mm in width of narrowest part 2c was used as a positive electrode conductive core 2a of a positive electrode 2. Using this core 2a and the negative electrode 1 used in the cell (A), the cell (F) was manufactured in the same method as in the cell (A). That is, the active material is placed at one side only of the core 2a, and the active material is not placed at the other side, and the core 2a is exposed. The width of narrowest part 2c of the core 2a of the positive electrode 2 is 0.15 mm, and the thickness of the negative electrode 1 is 0.16 mm. Hence, the width of narrowest part 2c of the core 2a is smaller than the thickness of the negative electrode 1. Further, one side of the core 2a of the positive electrode 2 is exposed.

Cell (G)

As a cell (G), a cylindrical cell of same dimensions as in cell (A) was fabricated. As a positive electrode conductive core 2a of a positive electrode 2, a stainless steel mesh of 0.1 mm in wire diameter and 1 mm in cutting width was used. Using this core and the negative electrode 1 used in the cell (A), the cell (G) was manufactured in the same method as in the cell (A). In this case, the width of narrowest part 2c of the core 2a is 0.1 mm corresponding to the wire diameter, and the thickness of the negative electrode is 0.16 mm. Hence, the width of narrowest part 2c of the core 2a is smaller than the thickness of the negative electrode 1. Further, one side of the core 2a of the positive electrode 2 is exposed.

Cell (H)

Figure 5:
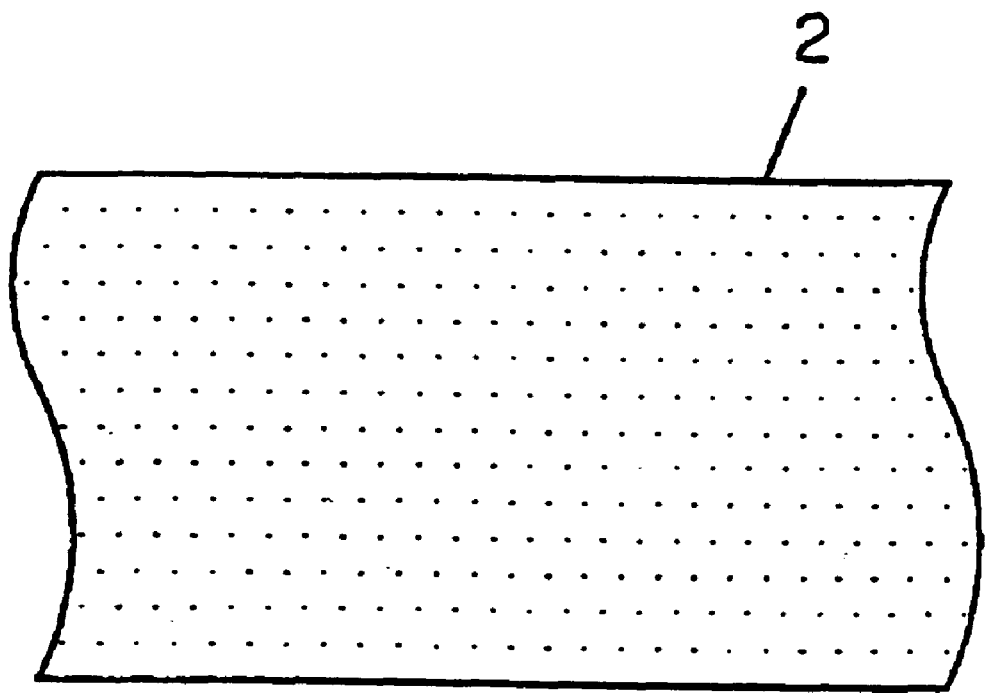
FIG. 5(a) is a plan view of a positive electrode used in a comparative example.
FIG. 5(b) is a sectional view of the positive electrode shown in FIG. 5(a).
Figure 5:
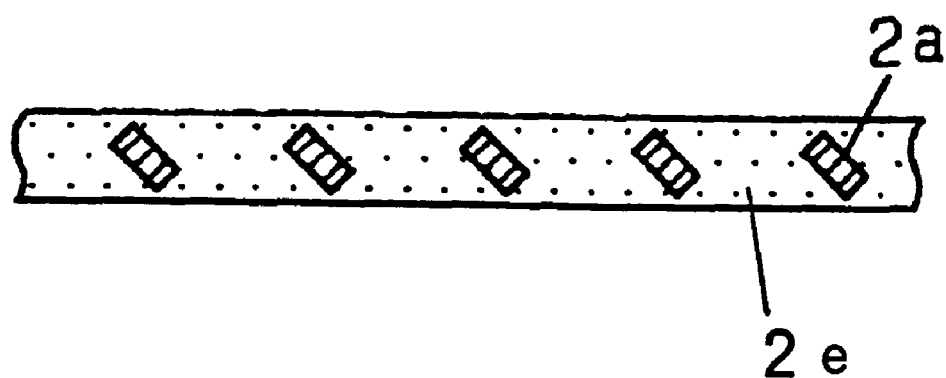

As a cell (H), a cylindrical cell of the same dimensions as in cell (A) was fabricated. The cell (H) was manufactured in the same method as in the cell (A) except for the filling method of positive electrode 2. In the positive electrode forming process, first, using a positive electrode conductive core 2a of same stainless steel expand metal as in the cell (A), a positive electrode active material 2e was applied in a thickness of 0.3 mm. Further, from the back side, the active material 2e was applied again in a thickness of 0.65 mm. In addition, it was rolled to a thickness of 0.45 mm. In this state, the plate surface of the positive electrode conductive core 2a is not exposed. The surface state of this positive electrode is shown in FIG. 5(b). Using this positive electrode 2 and the negative electrode 1 used in the cell (A), the cell (H) was manufactured in the same method as in the cell (A). That is, the width of narrowest part 2c of the core 2a is greater than the thickness of the negative electrode 1. Moreover, the both sides of the core 2a of the positive electrode 2 are covered with the active material 2e and are not exposed.

Cell (I)

As a cell (I), a cylindrical cell of the same dimensions as in cell (A) was fabricated. A stainless steel expand metal of 0.1 mm in thickness, 0.5 mm in cutting width 2b, and 0.18 mm in width of narrowest part 2c was used as a positive electrode conductive core 2a of a positive electrode 2. Using this core 2a, an active material 2e was placed at both sides of the core 2a. Using the formed positive electrode 2 and the negative electrode 1 used in the cell (A), and the cell (I) was manufactured in the same method as in the cell (A). That is, the width of narrowest part 2c of the core 2a is greater than the thickness of the negative electrode 1. Moreover, both sides of the core 2a of the positive electrode 2 are covered with the active material 2e and are not exposed.

Cell (J)

As a cell (J), a cylindrical cell of the same dimensions as in cell (A) was fabricated. A stainless steel mesh of 0.18 mm in wire diameter and 1 mm in cutting width was used as a positive electrode conductive core 2a of a positive electrode 2. That is, the width of narrowest part 2c of the core is 0.18 mm. Using this core 2a, an active material 2e was placed at both sides of the core 2a. Using thus formed positive electrode 2 and the negative electrode 1 used in the cell (A), the cell (J) was manufactured in the same method as in the cell (A). That is, the width of narrowest part 2c of the core 2a is greater than the thickness of the negative electrode 1. Moreover, the both sides of the core 2a of the positive electrode 2 are covered with the active material 2e and are not exposed.

Cell (K)

As a cell (K), a cylindrical cell of the same dimensions as in cell (A) was fabricated. A stainless steel expand metal of 0.1 mm in thickness, 1.0 mm in cutting width $2b$, and 0.12 mm in width of narrowest part $2c$ was used as a positive electrode conductive core $2a$ of a positive electrode 2. Using this core $2a$, an active material $2e$ was placed at both sides of the core $2a$. Using thus formed positive electrode 2 and the negative electrode 1 used in the cell (A), the cell (K) was manufactured in the same method as in the cell (A). That is, the width of narrowest part $2c$ of the core $2a$ is smaller than the thickness of the negative electrode 1. Moreover, the both sides of the core $2a$ of the positive electrode 2 are covered with the active material $2e$ and are not exposed.

Cell (L)

As a cell (L), a cylindrical cell of the same dimensions as in cell (A) was fabricated. A stainless steel mesh of 0.1 mm in wire diameter and 1 mm in cutting width was used as a positive electrode conductive core $2a$ of a positive electrode 2. That is, the width of narrowest part $2c$ of the core is 0.1 mm. Using this core $2a$, an active material $2e$ was placed at both sides of the core $2a$. Using thus formed positive electrode 2 and the negative electrode 1 used in the cell (A), the cell (L) was manufactured in the same method as in the cell (A). That is, the width of narrowest part $2c$ of the core $2a$ is smaller than the thickness of the negative electrode 1. Moreover, the both sides of the core $2a$ of the positive electrode 2 are covered with the active material $2e$ and are not exposed.

Figure 6:
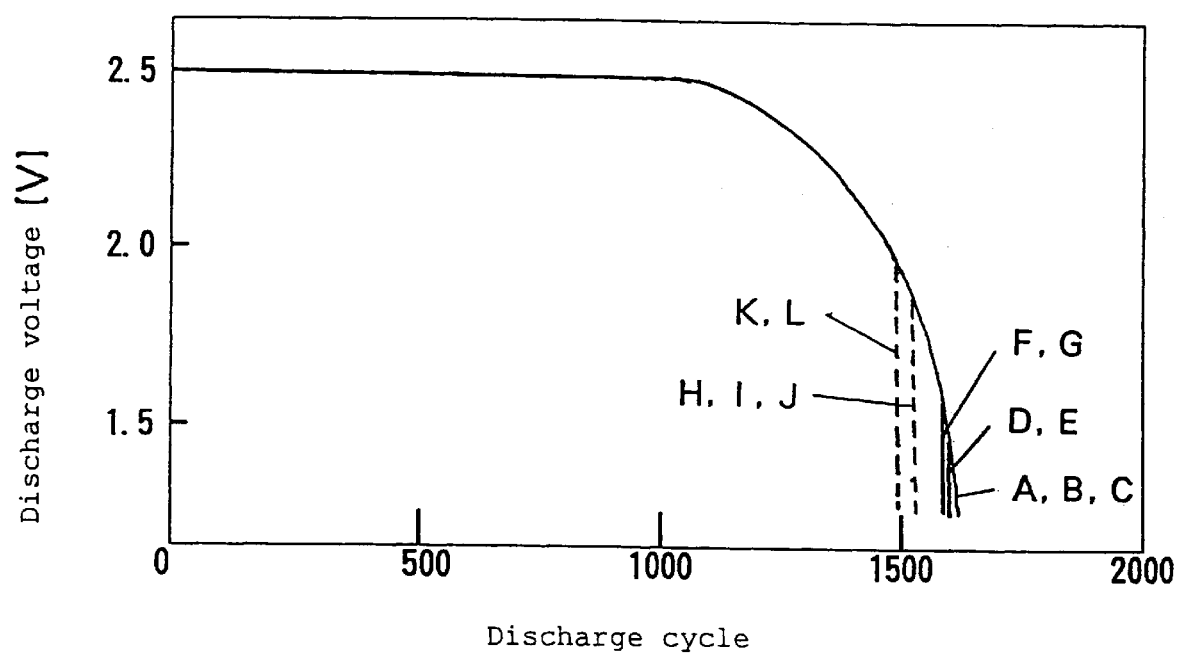
FIG. 6 is a graph showing results of discharge tests of batteries of an embodiment of the invention and a comparative example.

In these trial cells (A to L), the discharge capacity was compared. The discharge current condition is alternating discharge of 0.9A by ON for 3 sec and OFF for 27 seconds, and the discharge temperature is 20 deg. C. Discharge results of these cells in the specified discharge condition are shown in FIG. 6.

In the cell (A), cell (B), and cell (C), the discharge voltage dropped smoothly until the end of discharge, and the discharge cycles were about 1600 cycles.

In the cell (D) and the cell (E), at about 1.5 V, the discharge voltage dropped suddenly, and the discharge cycles were about 1590.

In the cell (F) and cell (G), at about 1.6 V, the discharge voltage dropped suddenly, and the discharge cycles were about 1580.

In the cell (H), cell (I), and cell (J), at about 1.9 V, the discharge voltage dropped suddenly, and the discharge cycles were about 1530.

In the cell (K) and cell (L), at about 2.0 V, the discharge voltage dropped suddenly, and the discharge cycles were about 1500.

That is, the cells (A, B, C, D, E, F, G) exposed at least in part of the core $2a$ of the positive electrode 2 have more discharge cycles than the cells (H, I, J, K) covered with active material on both sides of the core $2a$, and further have an excellent discharge capacity and a large discharge capacity up to the end of discharge. In particular, the above effects are excellent in the cells (A, B, C) exposed on one side of the core $2a$ of the positive electrode 2, and having the width of narrowest part $2c$ of T-he core $2a$ greater than the thickness of the negative electrode. Moreover, the above effects are excellent in the cells (D, E) exposed in at least part of the core $2a$ of the positive electrode 2, and having the width of the narrowest part $2c$ of the core $2a$ greater than the thickness of the negative electrode. However, these effects are slightly smaller in the cells (F, G) having the width of narrowest part $2c$ of the positive electrode conductive core $2a$ smaller than the thickness of the negative electrode.

In the embodiment, it is also possible to employ:

(1) a positive electrode having a positive electrode conductive core $2a$ exposed on the entire surface of the side of the positive electrode 2.

(2) a positive electrode exposed only in part, such as a peripheral portion of an insulating tape, or (3) a constitution having only the most protruding portions $2x$ of the positive electrode conductive core 2 exposed on the surface of the positive electrode 2 by the filling and rolling conditions, by using a porous metal plate or metal mesh having a three-dimensional structure.

The batteries having such constitution bring about excellent effects.

As described herein, by the constitution of the invention, the voltage drop at the end of discharge can be suppressed, and discharge capacity can be improved.

What is claimed is:

1. A battery comprising:

an electrolyte, a negative electrode, and a positive electrode including a conductive core and an active material covering said conductive core, wherein at least a portion of said core is exposed from said active material adjacent said negative electrode.

2. A battery of claim 1, wherein said conductive core is at least one metal of a porous metal plate and a metal mesh, and a width of a narrowest portion of the metal is greater than a thickness of said negative electrode.

3. A battery of claim 1, wherein a surface of said conductive core is exposed from said active material.

4. A battery of claim 1, wherein said conductive core is at least one of a metal and a metal mesh.

5. A battery of claim 1, wherein said conductive core is at least one of an expanded metal and a punching metal.

6. A battery of claim 1, wherein said conductive core is a porous metal plate including a three-dimensional structure having protrusions, and said protrusions are exposed from said active material.

7. A battery of claim 1, wherein said negative electrode includes at least one of an alkaline metal and an alkaline metal alloy, and said electrolyte is an organic electrolyte.

8. A battery of claim 1, wherein said negative electrode includes at least one of an alkaline metal and an alkaline metal alloy, said electrolyte is an organic electrolyte, at least a portion of said conductive core protrudes from said active material, said core is at least one metal of a porous metal plate and a metal mesh, and a width of a narrowest portion of said metal is greater than a thickness of said negative electrode.

9. A battery comprising:

an organic electrolyte, a negative electrode having at least one of an alkaline metal and an alkaline metal alloy, and a positive electrode including a conductive core having at least one metal of a porous metal plate and a metal mesh, and an active material covering said core, wherein at least a portion of said core is exposed from said active material adjacent said negative electrode, and a width of a narrowest portion of said metal is greater than a thickness of said negative electrode.

10. A battery of claim 9, wherein said conductive core is at least one of an expanded metal and a punching metal.

11. A battery comprising:

an electrolyte, a negative electrode, a positive electrode including a conductive core and an active material covering said conductive core, and an insulator placed on a portion of a surface of a part of said positive electrode, wherein the portion of the surface of said positive electrode at which said electric insulating tape is placed is devoid of said active material wherein said conductive core is at least one of a porous metal plate and a metal mesh and a width of narrowest portion of said metal is greater than a thickness of said negative electrode.

12. A battery of claim 11, wherein said conductive core is at least one of a porous metal and a metal mesh.

13. A battery of claim 11, wherein said conductive core is at least one of an expanded metal and a punching metal.

* * * * *